United States Patent [19]

Maeno

[11] Patent Number: 4,879,714
[45] Date of Patent: Nov. 7, 1989

[54] CHANNEL ASSIGNMENT SYSTEM FOR LOOP NETWORK

[75] Inventor: Kazutoshi Maeno, Tokyo, Japan

[73] Assignee: NEC Corporation, Tokyo, Japan

[21] Appl. No.: 799,582

[22] Filed: Nov. 19, 1985

[30] Foreign Application Priority Data

Nov. 20, 1984 [JP] Japan .................................. 59-245326
Nov. 20, 1984 [JP] Japan .................................. 59-245327

[51] Int. Cl.$^4$ ................................................ H04J 3/16
[52] U.S. Cl. ................................ 370/85.7; 340/825.05
[58] Field of Search ........................ 370/86, 88, 89, 90; 340/825.05, 825.5

[56] References Cited

U.S. PATENT DOCUMENTS

| | | | |
|---|---|---|---|
| 3,961,139 | 6/1976 | Bowman et al. ...................... | 370/89 |
| 4,144,410 | 3/1979 | Flickinger et al. .................... | 370/89 |
| 4,271,506 | 6/1981 | Broc et al. ............................ | 370/89 |
| 4,383,315 | 5/1983 | Torng ............................. | 340/825.05 |
| 4,460,994 | 7/1984 | Scanlon et al. ....................... | 370/88 |
| 4,553,234 | 11/1985 | Brandsma et al. .................... | 370/89 |
| 4,566,097 | 1/1986 | Bederman ............................. | 370/86 |

OTHER PUBLICATIONS

Stallings, William, "Data and Computer Communications", (published by Macmillan), pp. 307-311 and 339-342.

Primary Examiner—Benedict V. Safourek
Assistant Examiner—Stephen Chin
Attorney, Agent, or Firm—Foley & Lardner, Schwartz, Jeffery, Schwaab, Mack, Blumenthal & Evans

[57] ABSTRACT

A channel assignment system for allowing a plurality of nodes in a loop network, which includes a network control nodes, to hold a duplex communication by time division circuit switching. The network control node is provided with a channel rearrange device. Channels the number of which is smaller than that of the nodes by one are used and, in order that the nodes may be accessed as if they had individual exclusive channels, the channels are logically shifted for rearrangement by the channel rearrange device after each round through the loop. Further, each of the nodes on the loop is provided with a channel rearrange device. Channels the number of which is smaller than that of the nodes are used and, in order that the nodes may be accessed as if they had individual exclusive channels, the channels are logically shifted for rearrangement by the channel rearrange device of each node at each time of data transmission and reception.

3 Claims, 35 Drawing Sheets

FIG. 5B  NODE A 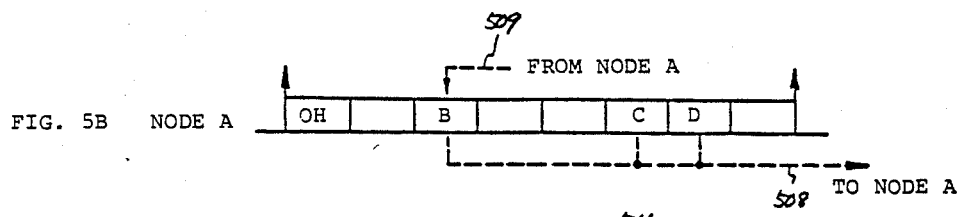
FIG. 5C  NODE B 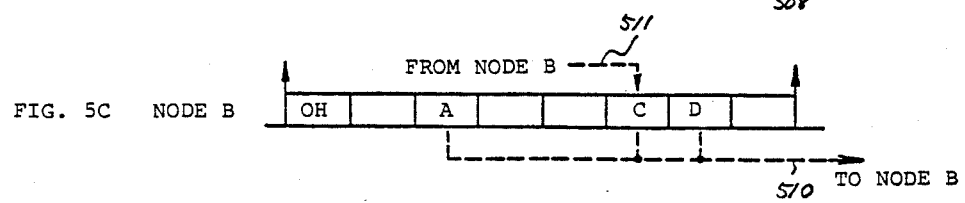
FIG. 5D  NODE C 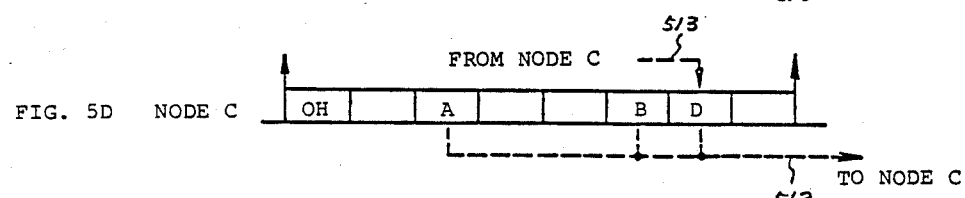
FIG. 5E  NODE D 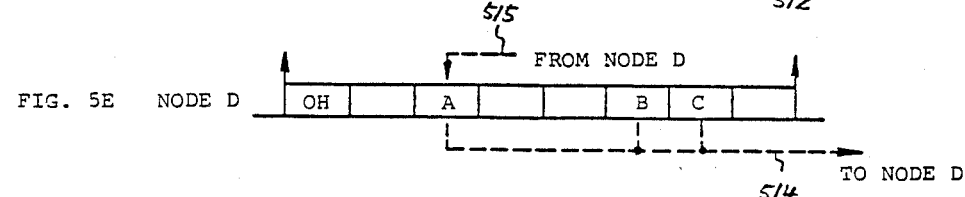
FIG. 5F  NETWORK CONTROL NODE 400 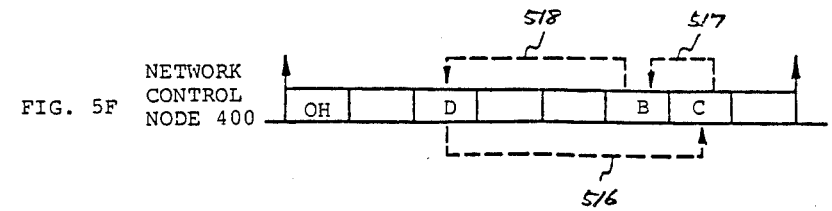

FIG. 7
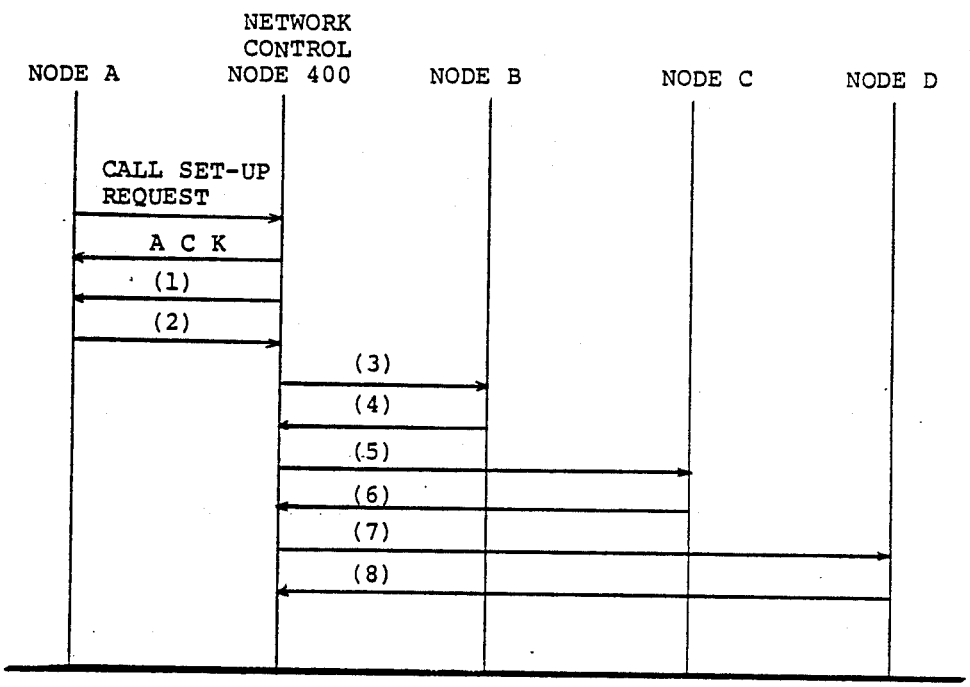
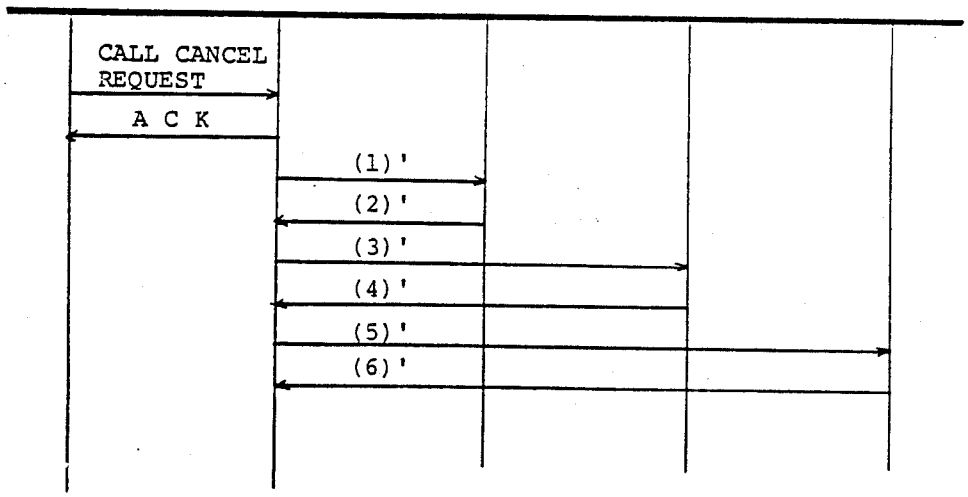

FIG. 11
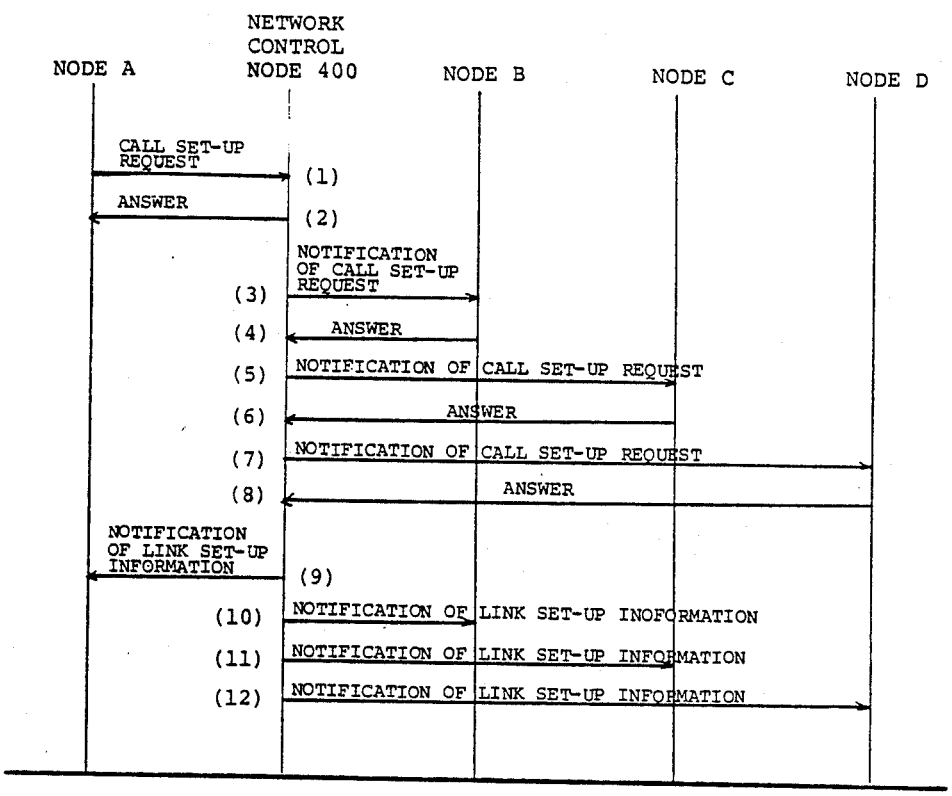
4-NODE DUPLEX COMMUNICATION
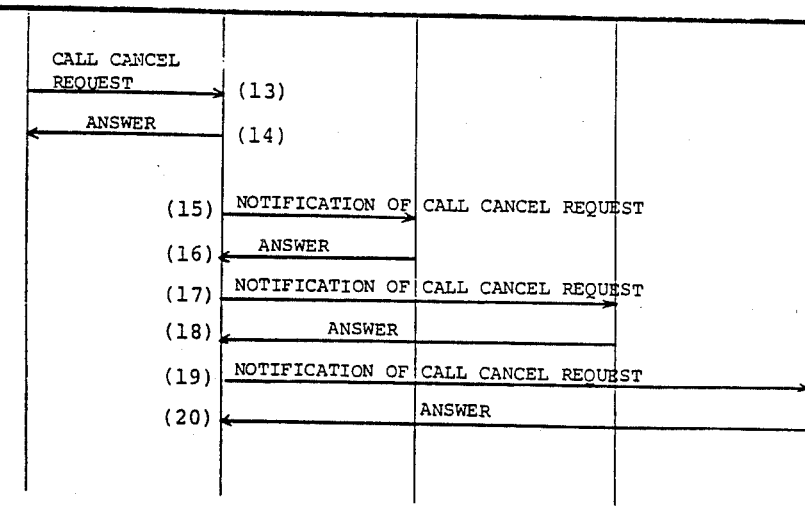

FIG. 12
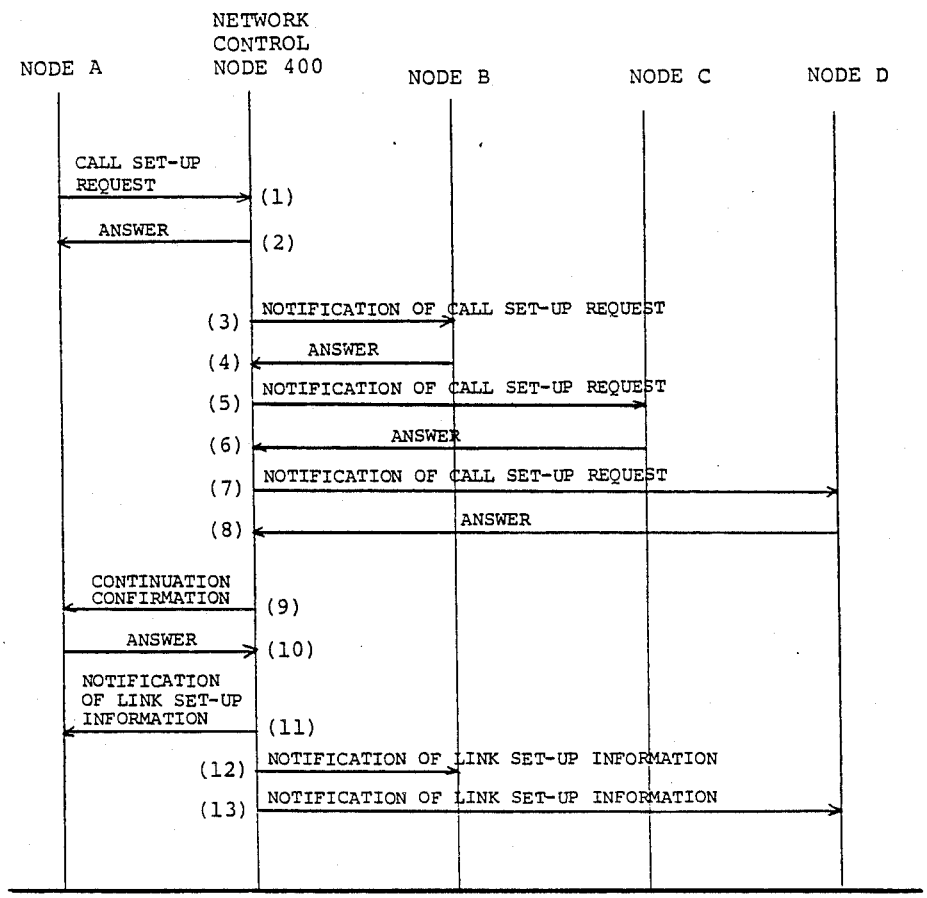
3-NODE DUPLEX COMMUNICATION
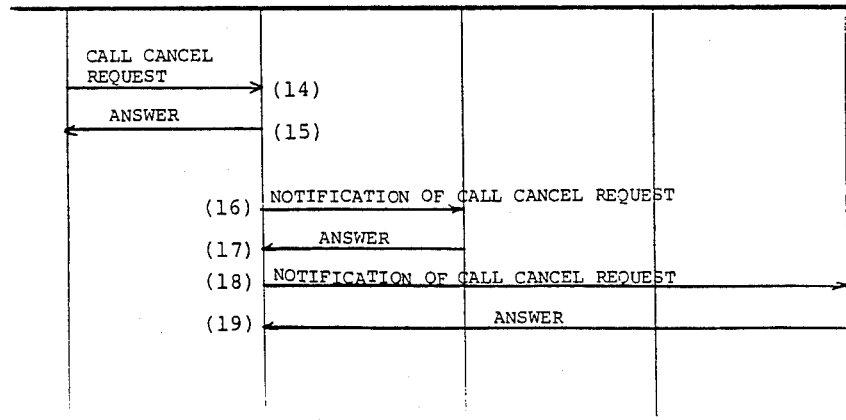

FIG. 14B NODE A 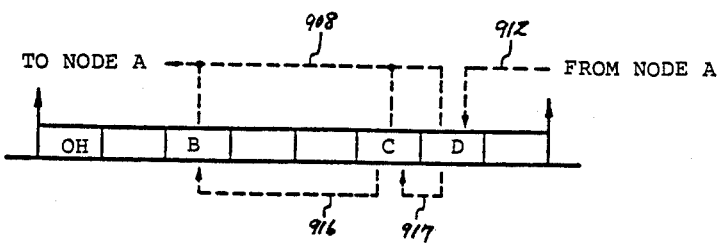
FIG. 14C NODE B 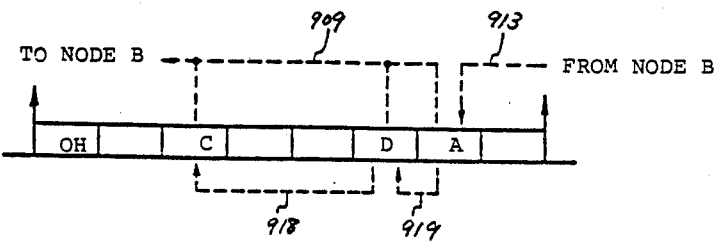
FIG. 14D NODE C 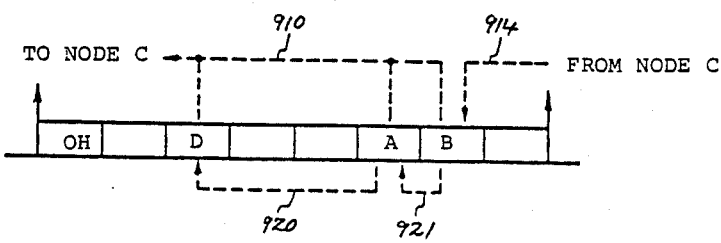
FIG. 14E NODE D 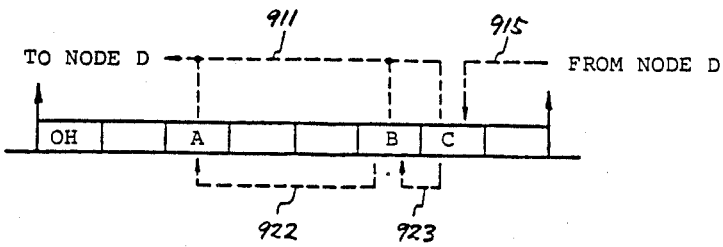

CHANNEL ASSIGNMENT SYSTEM FOR LOOP NETWORK

BACKGROUND OF THE INVENTION

The present invention relates to a channel assignment system for a loop network, particularly a loop network having a network control node, which allows a plurality of nodes to hold a duplex communication therebetween by time division circuit switching.

A channel assignment system applicable to duplex communication which is effected between a plurality of nodes in a loop network by time division circuit switching is described in, for example, "DATA AND COMPUTER COMMUNICATIONS" written by William Stallings (published by Macmillan), pp. 307-311 and 339-342. An example of such a system is shown in FIGS. 1-3.

Referring to FIG. 1, a prior art channel assignment system is shown which comprises a network control node, or center node, 100 and nodes 102-110. The network control node 100 and the nodes 102-110 are interconnected by a transmission path 111 to complete a loop network. The control node 100 includes a demand assign device 101 adapted to assign idle channels responsive to a communication request which may be sent thereto from any of the nodes 102-110. A frame with an exemplary channel arrangement is shown in FIG. 2. As shown, the frame includes an overhead 200 consisting of several bits and used for loop synchronization and frame synchronization purposes. The frame also includes channels 201-207. Generally, concerning circuit switching in a loop type network, a plurality of channels are set up in bits or bytes on a time division basis along a time base 208. In the illustrated example, the frame comprises the seven channels 201-207 and the overhead 200.

In FIG. 1, let the nodes 103, 104, 107 and 110 be called nodes A, B, C and D, respectively, and assume that all these nodes A–D ae capable of performing multi-station duplex communication. Then, as shown in FIG. 3, four idle channels are secured and assigned one to each of the nodes A–D. In this particular example, a channel 1 designated by the reference numeral 301 is assigned to the node A, a channel 2 designated by the reference numeral 302 to the node B, a channel 5 designated by the reference numeral 305 to the node C, and a channel 6 designated by the reference numeral 306 to the node D. Each of the nodes A–D reads pieces of information from the other three nodes through an exclusive read channel, while sending information to the other nodes on an exclusive write channel of its own.

The prior art channel assignment system as described above has the following problem. For N nodes on the loop network to hold a duplex communication therebetween, it is necessary to secure N idle channels. However, considering the topology particular to a loop, information is sequentially routed through the nodes according to a predetermined transmission direction of the loop, so that information transmitted from a certain node is practically valueless while it is returned from the last node in the loop, as viewed from the transmitted node, to the transmitted node. For example, in the case of digital picture transmission which needs a data rate of the order of 100 Mbps, meaningless information is undesirably propagated through the loop at the rate of 100 Mbps between the last node and the transmitted node. Such significantly limits the available transmission capacity of a loop network.

SUMMARY OF THE INVENTION

It is therefore an object of the present invention to provide a channel assignment system for a loop network which minimizes the number of channels necessary for multi-station duplex communication between a plurality of nodes, which is effected on a time division circuit switching basis.

It is another object of the present invention to provide a generally improved channel assignment system for a loop network.

In accordance with one aspect of the present invention, there is provided a system for assigning channels for multi-station duplex communication having nodes which belong to a loop network communicating therebetween by time division circuit switching, comprising a network control node located on a loop of the loop network and provided with a channel rearrange device for controlling the channel assignment, and a plurality of nodes located on the loop of the loop network for performing the multi-station duplex communication. The channel rearrange device is constructed to use channels which are smaller in number than the nodes by one and rearrange the channels used by logically shifting the channels after every round through the loop.

In accordance with another aspect of the present invention, there is provided a system for assigning channels for multi-station du0plex communication having nodes which belong to a loop network communicating therebetween by time division circuit switching, comprising a center node located on a loop of the loop network, and a plurality of nodes distributed on the loop of the loop network for performing the multi-station duplex communication. Each of the nodes is provided with a channel rearrange device for controlling the channel assignment. Each of the channel rearrange device is constructed to use channels which are smaller in number than the nodes by one and rearrange the channels used by logically shifting the channels at each time of data transmission and reception at the node, thereby fixing channels which are to be used by each of the nodes.

In accordance with yet another aspect of the invention, there is described a multi-station duplex communication network comprising a plurality of nodes and a network control node. The plurality of nodes are connected in series with one another in a single loop in a unidirectional time division switching communication system. The network control node is connected in the single loop. The network control node includes means for rearranging channel assignments by logically shifting the channels after every round through the single loop. Moreover, the channel assignment rearranging means is operative for rearranging channel assignments on a number, n, of channels smaller in number than a number, N, of nodes communicating with each other such that n=N−1, where n and N are integers.

The above and other objects, features and advantages of the present invention will become more apparent from the following detailed description taken with the accompanying drawings.

BRIEF DESCRIPTION OF THE DRAWINGS

FIGS. 5A-5F show examples of channels which are assigned in accordance with the system of FIG. 4;

FIG. 7 shows in a sequence diagram a call set-up and a call cancel procedures in accordance with the system of FIG. 4;

FIGS. 11 and 12 show flows of signals between the network control node and the nodes which are associated with the algorithm of FIG. 10;

FIGS. 14A-14E show examples of channels assigned in accordance with the system of FIG. 13.

DESCRIPTION OF THE PREFERRED EMBODIMENTS

While the channel assignment system for a loop network of the present invention is susceptible of numerous physical embodiments, depending upon the environment and requirements of use, substantial numbers of the herein shown and described embodiments have been made, tested and used, and all have performed in an eminently satisfactory manner.

Figure 1:
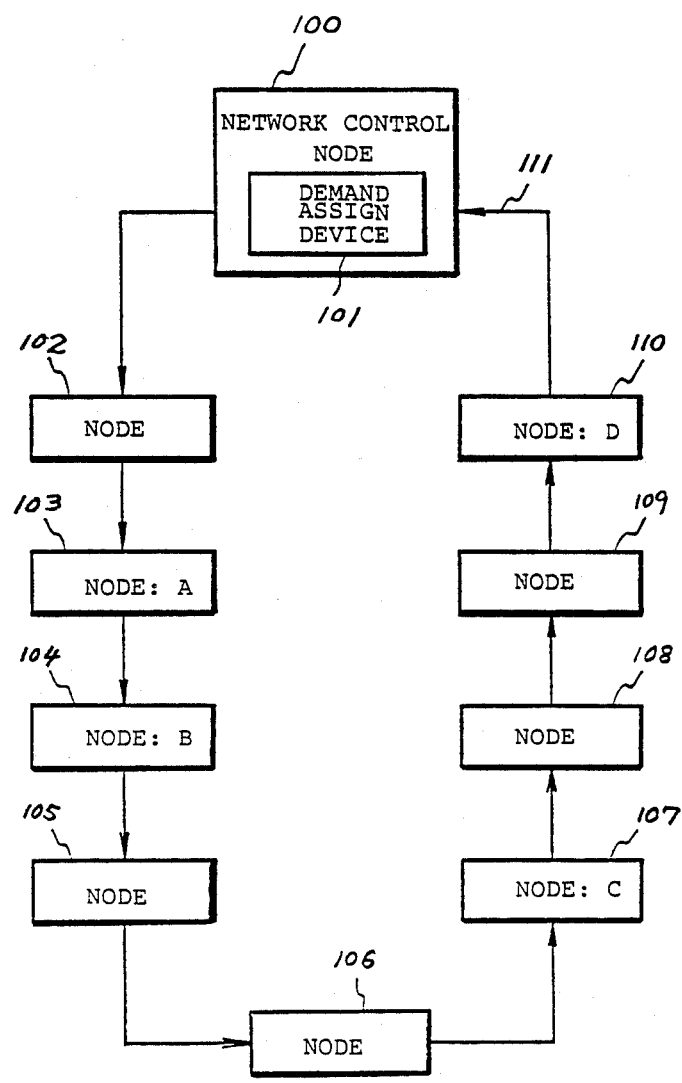
FIG. 1 is a schematic diagram representative of a prior art channel assignment system for a loop network.
Figure 2:
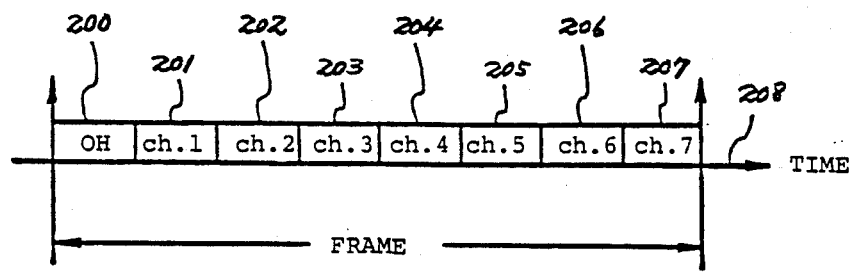
FIG. 2 shows channels arranged in accordance with the prior art system of FIG. 1.
Figure 3:
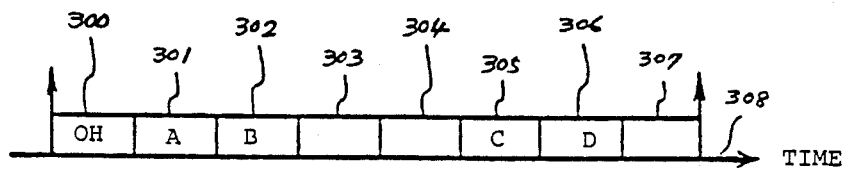
FIG. 3 shows exemplary channels assigned in accordance with the system of FIG. 1.
Figure 4:
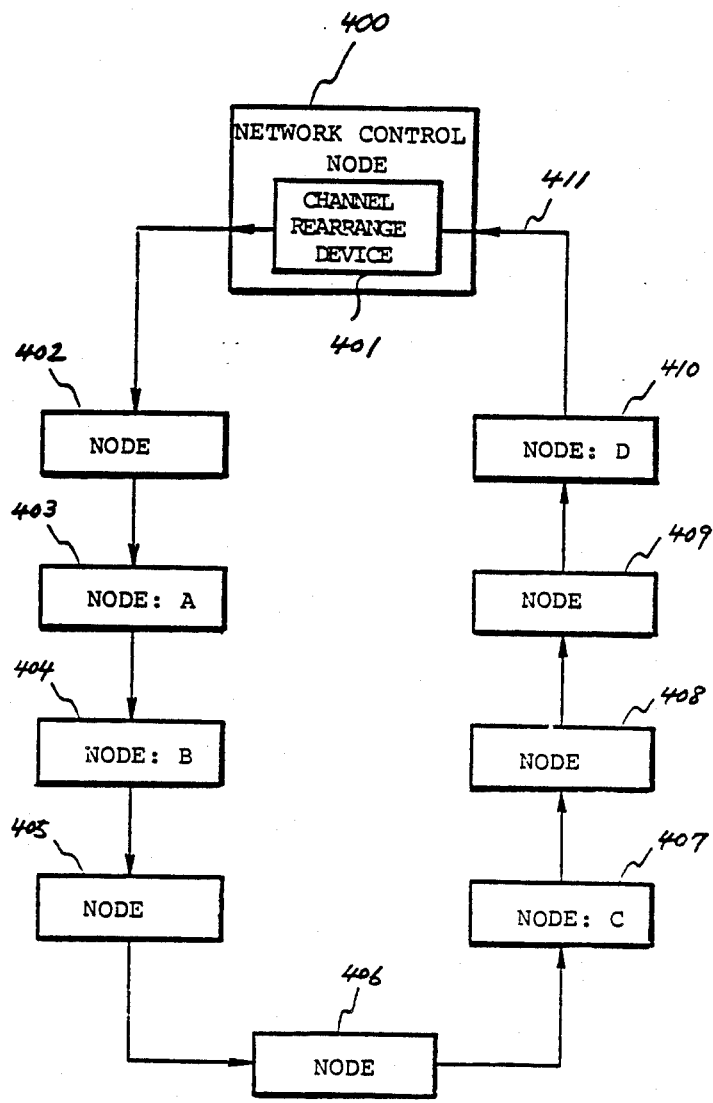
FIG. 4 is a schematic diagram representative of a channel assignment system embodying the present invention.

Referring to FIG. 4 of the drawings, a channel assignment system in accordance with the present invention is shown and comprises a network control node 400 and nodes 402-410. The network control node 400 is provided with a channel rearrange device 401. The network control node 400 and the nodes 402-410 are interconnected by a transmission path 411 to complete a loop network. The number of channels is smaller by one than the number of nodes which are in use for duplex communication. The network control node 400 restores the channel arrangement in which the channels have changed place with each other after each round through the loop to the original arrangement and, then, sends the restored channel arrangement to the loop.

In FIG. 4, let the nodes 403, 404, 407 and 410 be called nodes A, B, C and D, respectively. The channel assignment system will be described in relation to multi-station duplex communication which is effected between the four nodes A-D by time division circuit switching.

Figure 5A:
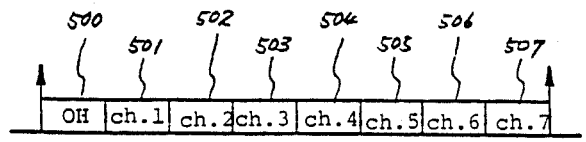

Assume that information is transmitted counterclockwise through the loop as viewed in FIG. 4, and that all the four nodes A-D are to hold a duplex communication therebetween. Before the communication, the network control node 400 secures three idle channels and informs each of the nodes A-D of which channel the node may use and to which channels the other three informations to be received by the node have been assigned, based on the positional relationship between the nodes A-D. A specific example of such channel assignment is shown in FIGS. 5A-5F. In FIG. 5A, there are shown an overhead 500, a channel 1 designated by the reference numeral 501, a channel 2 designated by the reference numeral 502, a channel 3 designated by the reference numeral 503, a channel 4 designated by the reference numerals 504, a channel 5 designated by the reference numeral 505, a channel 6 designated by the reference numeral 506, and a channel 7 designated by the reference numeral 507.

Responsive to a request from the group of the nodes A, B, C and D, the network control node 400 secures three idle channels which, in this particular example, are assumed to be the channels 2, 5 and 6. The network control node 400 informs the node A of the fact that the channels 2, 5 and 6 store pieces of information which are transmitted from the other nodes B, C and D, respectively, and the fact that after reading that information the node A may write its own information in the channel 2. Likewise, the network control node 400 informs the node B of the fact that the channels 2, 5 and 6 store pieces of information which are transmitted from the nodes A, C and D, respectively, and the fact that after reading that information the node B may write its own information in the channel 5. Further, the network control node 400 informs the node C of the fact that the channels 2, 5 and 6 store pieces information which are transmitted from the nodes A, B and D, respectively, and the fact that after reading that information the node C may write its own information in the channel 6; and the node D of the fact that the channels 2, 5 and 6 store pieces of information from the nodes A, B and C, and the fact that after reading that information the node D may write its own information in the channel 2.

After each duplex communication link has been set up by the above procedure, the system enters into an actual communication mode. After the start of a communication, the channels are used at each node as shown in FIGS. 5B-5E. In FIGS. 5B-5E, write lines into the respective nodes A-D are designated by the reference numerals 508, 510, 512 and 514, and write lines from the same by the reference numerals 509, 511, 513 and 515.

It will be seen from the foregoing description taken with FIGS. 5B-5E that the node A deletes the information from the node B by writing its own information into the channel 2 and, likewise, the other nodes B, C and D deletes respectively the information from the nodes C, D and A by writing their own informations. This is practicable due to the topology of a loop. Specifically, concerning the node A, since the information from the node B has been read by the nodes C and D before reaching the node A, that is, since the node A is the last node to read the information from the node B, the node A is allowed to write its own information in the channel 2 after reading the information from the node B. The same holds true with the other nodes B, C and D.

The channel rearrange device 401 which is installed in the network control node 400 functions to rearrange the channels before the informations are fed again to the node A after making one round through the nodes A, B, C and D. The channel rearrangement is shown in FIG. 5F. After propagation through the node D, the channel 2 has stored the information associated with the channel D, the channel 5 the information associated with the channel B, and the channel 6 the information associated with the channel C, as previously stated. As indicated by the reference numerals 516–518 in FIG. 5F, the channel rearrangement is such that the node D information is shifted from the channel 6 to the channel 5, the node C information from the channel 6 to the channel 5, and the node B information from the channel 5 to the channel 2.

Where the channels are of the bit multiplex type, the rearrangement described above can be accomplished simply by logically shifting the channels 2, 5 and 6 one bit round. Such an operation does not depend upon the number of communication nodes. The channel rearrange device 401 may readily be implemented using a random access memory. If the channel rearrange device 401 is absent, the order of the channels sent will have been changed at the second round through the nodes A, B, C and D. Specifically, as shown in FIG. 5E, the channel 2 coming out from the node D stores the node D information, the channel 5 the node B information, and the channel 6 the node C information; should such channels be transmitted to the node A, the information stored therein would not be recognized at node A, thus preventing communication.

The prerequisite with each node in time division circuit switching is that the write channel and the read channel be fixed, as the network control node 400 informs each node before the start of a communication as described above. In accordance with the present invention, the channel rearrange device 401 built in the network control node 400 makes it possible to fix the channels at each of the nodes, even though the number of channels available for communications is smaller than that of communication nodes by one.

Specific constructions and operations of the network control node 400, channel rearrange device 401 and nodes 402–410 will be described with reference to FIGS. 6–12.

Figure 6:
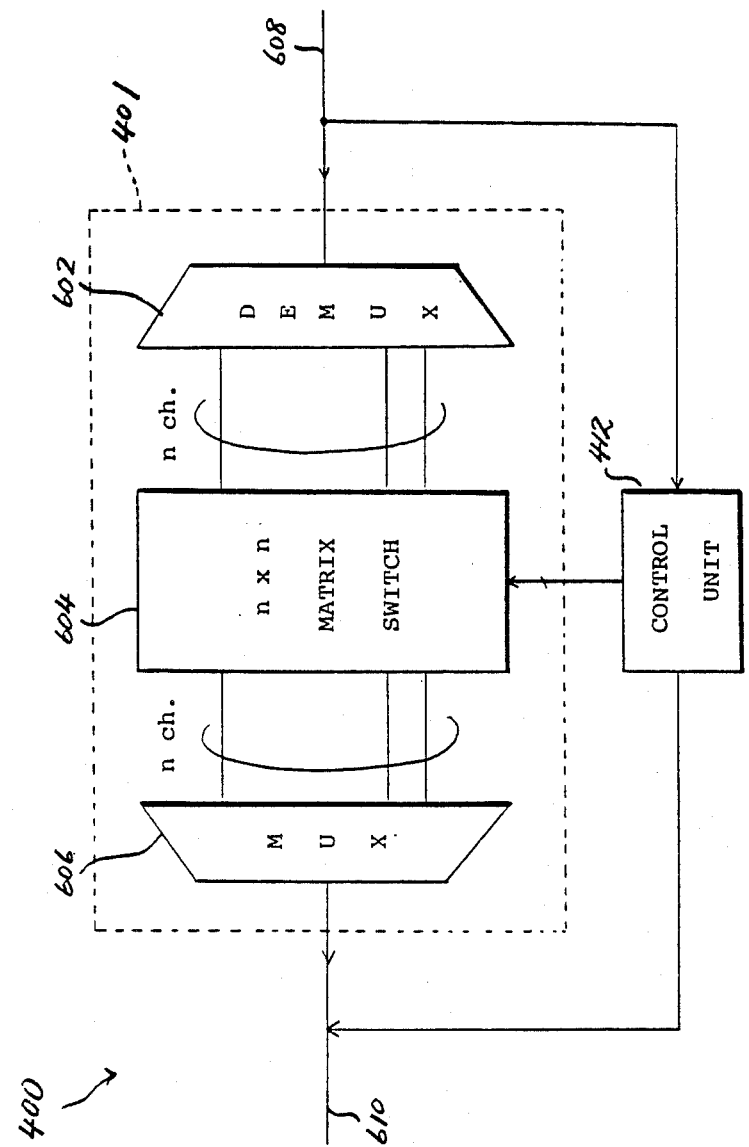
FIG. 6 is a block diagram showing a specific construction of a network control node which is included in the system of FIG. 4.

Referring to FIG. 6, a specific construction of the network control node 400 is shown. The node 400 comprises the channel rearrange device 401, indicated by a phantom block, and a control unit 412 for controlling the device 401. Functions assigned to the control unit 412 are processing various commands from the nodes 402–410 such as a call set-up and a call cancel requests, assigning channels and informing the nodes of the assigned channels, controlling channel rearrangement, and others. The channel rearrange device 401, on the other hand, comprises a demultiplexer (DEMUX) 602, an n×n (n being the number of channels) matrix switch 604, and a multiplexer (MUX) 606. Data coming in from a transmission path 608 are applied to the DEMUX 602 so that the respective channels are developed in parallel. The outputs of the DEMUX 602 are routed through the matrix xwitch 604 to the MUX 606 to be converted to a serial sequence, which is then fed out to a transmission line 610.

The network control node 400 having the above construction controls channel rearrangement as will be described. As previously stated in relation to the illustrative embodiment, the rearrangement is such that the node D information is shifted from the channel 2 to the channel 6, the node C information from the channel 6 to the channel 5, and the node B information from the channel 5 to the channel 2. This is readily accomplished with the n×n matrix switch 604 which switches the channels 2, 5 and 6 to the channels 6, 5 and 2, respectively.

Referring to FIG. 7, an example of a call set-up procedure and that of a call cancel procedure are shown. In these particular examples, the node A out of all the nodes in the embodiment of FIGS. 4 and 5 is assumed to be a calling station by way of example. In FIG. 7, STEPS (1), (3), (5) and (7) represent notification of link set-up information, STEPS (2), (4), (6) and (8) acknowledgement (ACK) responsive to the link set-up information, STEPS (1)', (3)' and (5)' notification of link cancel information, and STEPS (2)', (4)' and (6)' acknowledgement (ACK) responsive to the link cancel information.

Figure 8:
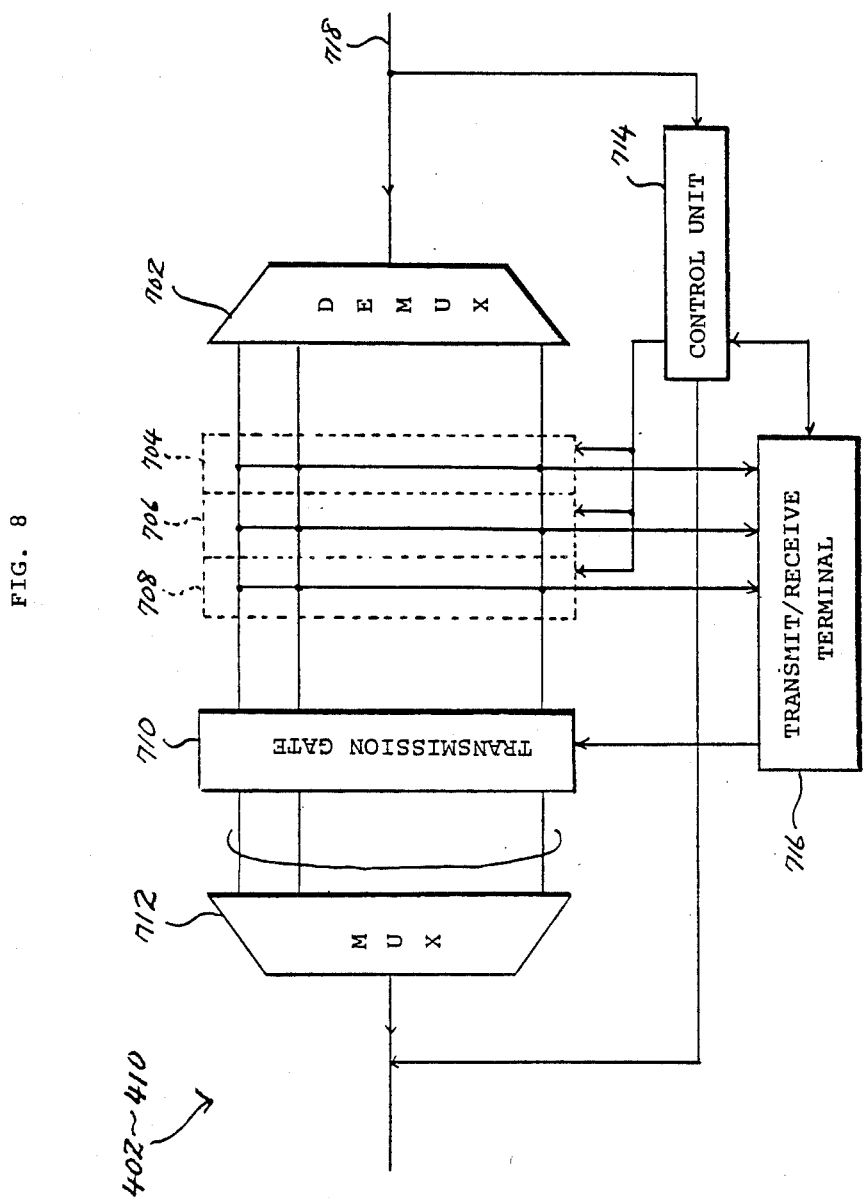
FIG. 8 is a block diagram showing a specific construction of each of the nodes which are included in the system of FIG. 4.

Referring to FIG. 8, a specific construction of each of the nodes 402–410 is shown. As shown, the node comprises a DEMUX 702, reception channel selectors 704, 706 and 708, a transmission gate 710, a MUX 712, a control unit 714, and a transmit/receive terminal 716. The node shown in FIG. 8 is applicable to four-station duplex communication as shown in FIGS. 4 and 5 and, for this reason, furnished with three reception channel selectors. The control unit 714 fulfills the functions of delivering commands from the transmit/receive terminal 76 to the network control node 400, and controlling the selection of channels for transmission and reception. The control unit 714 comprises a microprocessor and the above-stated functions are implemented with software.

The node having the above construction will be operated as follows.

Figure 9:
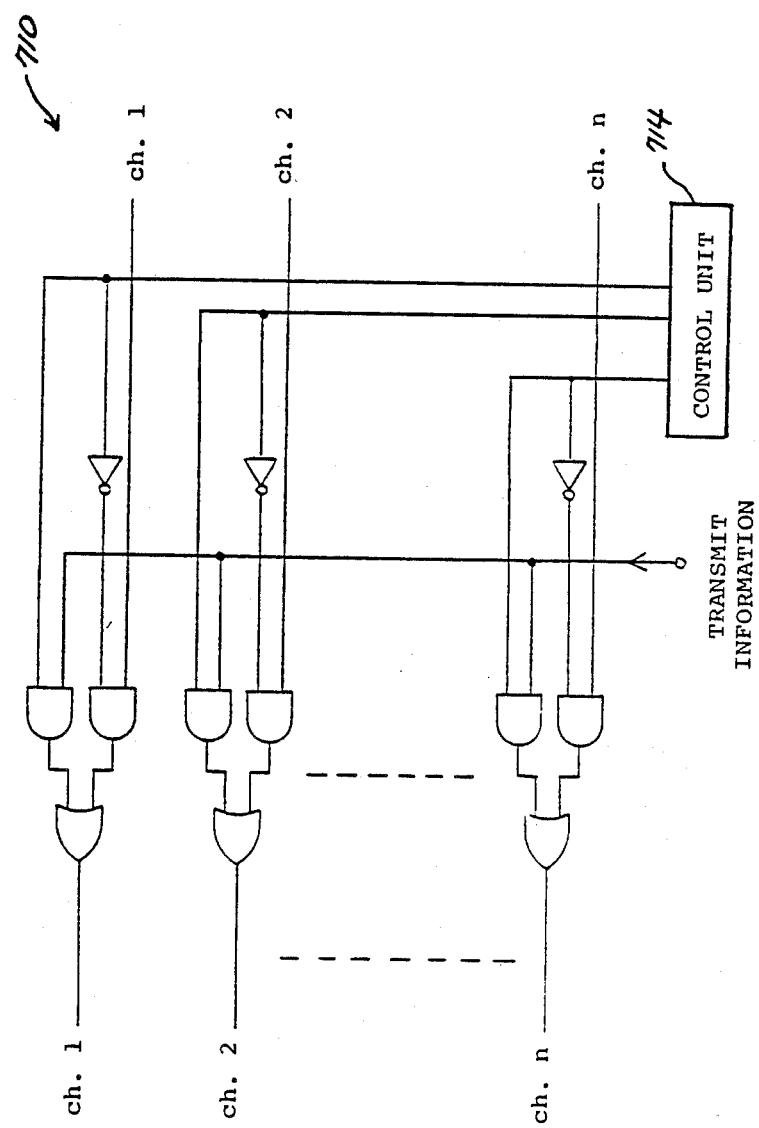
FIG. 9 is a diagram showing a specific construction of a transmission gate which is shown in FIG. 8.

Data from a transmission path 718 are applied to the DEMUX 702 to be developed in parallel channel by channel. The data output from the DEMUX 702 are fed to the reception channel selectors 704, 706 and 708 for selecting a reception channel and to the transmission gate 710 for selecting a transmission channel. The selection is controlled by the control unit 714 responsive to selection data which are supplied from the network control node 400. A specific construction of the transmission gate 710 is shown in FIG. 9. In the duplex communication between the nodes A–D of the illustrative embodiment, the node A, for example, selects the channels 2, 5 and 6 by means of the reception channel selectors 704, 706 and 708 so as to read information from the nodes B, C and D, respectively. The transmission gate 710 selects the channel 2 to write the own information therein.

Figure 10:
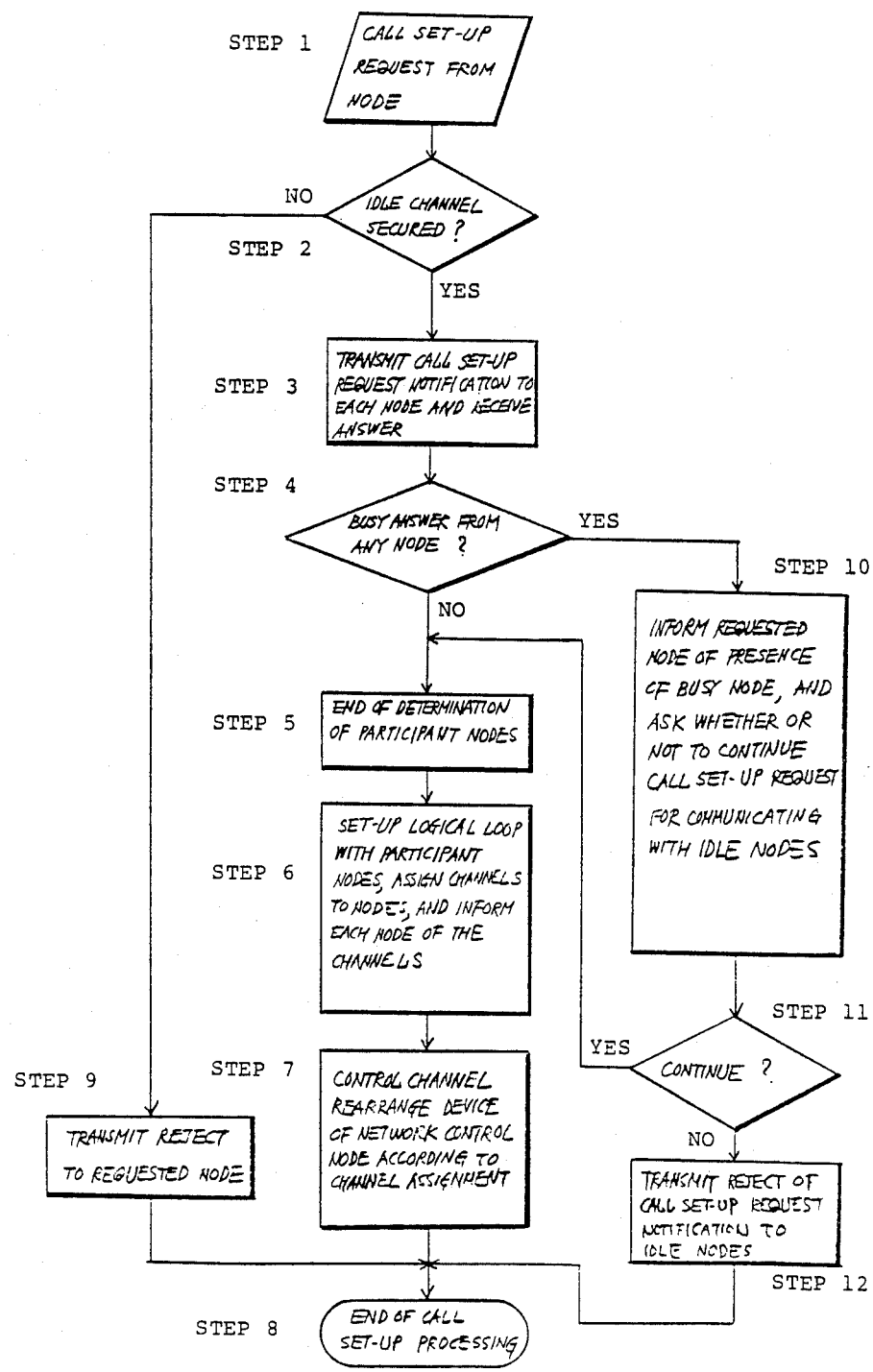
FIG. 10 is a flowchart representative of a specific algorithm of a call set-up request processing in accordance with the system of FIG. 4.

Referring to FIG. 10, there is shown an exemplary algorithm for implementing a call set-up request processing which the network control node 400 performs in the channel assignment system of the present invention. Flows of signals between the network control node 400 and the nodes A–D which are associated with the algorithm of FIG. 10 are shown in FIGS. 11 and 12. The flow shown in FIG. 11 represents a path which goes through STEPS 1, 2, 3, 4, 5, 6, 7 and 8 of FIG. 10, while the flow shown in FIG. 12 represents a path which goes through STEPS 1, 2, 3, 4, 10, 11, 12 and 8. STEPS (13)–(20) shown in FIG. 11 and STEPS (14)–(19) shown in FIG. 12 represent call cancel request processings which are common to each other. A call cancel request is assumed to be generated by a particular node which has generated a call set-up request without exception.

The duplex communication between the nodes A–D of the illustrative embodiment will be described with reference to FIGS. 10 and 11.

A call set-up request processing will be described first, referring to FIG. 11.

(a) The network control node 400 receives a call set-up request from the node A which desires to communicate with the nodes B, C and D, STEP (1);

(b) The control node 400 secures three idle channels (channels 2, 5 and 6 in the illustrative embodiment) and, then, returns a channel secure signal to the noe A. When no idle channel is found, the control node 400 returns a reject signal to the node A and finishes the processing, STEP (2);

(c) The control node 400 sends a call set-up request notification to the node B to inform it of the request from the node A, STEP (3);

(d) The node B responds to the notification by notifying the control node 400 whether it is idle or busy (it is assumed to be idle for the following steps), STEP (4);

(e) The STEPS (3) and (4) are repeated on each of the other nodes C and D, STEPS (5) and (6) and STEPS (7) and (8);

(f) At the STEP (8), the control node 400 has confirmed that all the nodes B, C and D are idle, STEP 5 of FIG. 10;

(g) Before advancing to STEPS (9)–(12), the control node 400 performs STEP 6 as shown in FIG. 10. Specifically, the network control in the channel assignment system of the present invention is characterized in that orders of connection of all the nodes which are covered by the loop network are stored in a table. For example, in the loop network of FIG. 4, the nine nodes 402–410 are interconnected in a loop. Such data are stored as shown in Table 1 below by way of example.

TABLE 1

| NODE No. | UPSTREAM NODE | DOWNSTREAM NODE |
|---|---|---|
| 402 | 410 | 403 |
| 403 | 402 | 404 |
| 404 | 403 | 405 |
| 405 | 404 | 406 |
| 406 | 405 | 407 |
| 407 | 406 | 408 |
| 408 | 407 | 409 |
| 409 | 408 | 410 |
| 410 | 409 | 402 |

Here, numbers 403, 404, 407 and 407 are assigned to the nodes A, B, C and D, respectively. In which order the nodes A, B, C and D are interconnected is determined using Table 1. Let such a connection be called a logical loop. Tracing Table 1, the control node 400 prepares Table II as shown below.

TABLE II

| NODE | UPSTREAM NODE | DOWNSTREAM NODE |
|---|---|---|
| A | D | B |
| B | A | C |
| C | B | D |
| D | C | A |

Based on Table II, the control node 400 sets up a link as described in relation to the illustrative embodiment, STEP 6 of FIG. 10; and (h) The control node 400 supplies each of the nodes A–D with link set-up data, STEPS (9)–(12).

This is the end of the call set-up processing.

Next, a call cancel processing will be described with reference to FIG. 11.

(i) The node A which has generated the call set-up request sends a call cancel request to the control node 400, STEP (13);

(j) Responsive to the request, the control node 400 returns an answer to the node A, STEP (14);

(k) The control node 400 sends a call cancel request notification to the node B. Then, the node B cancels its own channel selection control, STEP (15);

(l) After the above processing, the node B returns an answer to the control node 400, STEP (16);

(m) The STEPS (15) and (16) are repeated on each of the nodes C and D, STEPS (17) and (18) and STEPS (19) and (20); and (n) Responsive to an answer from the node D, the control node 400 cancels the logical loop table associated with the nodes A–D.

This is the end of the call cancel processing.

Referring to FIG. 12, a control flow which will occur when the answer at the STEP (4) shows that the node B is busy is shown. In this case, communication is held between the nodes A, C and D. Details of this particular control flow will not be described.

It is to be noted that the algorithm shown and described is only illustrative, that is, even an algorithm in which the control node 400 receives a request by sending polling signals to the nodes is applicable to the present invention.

Figure 13:
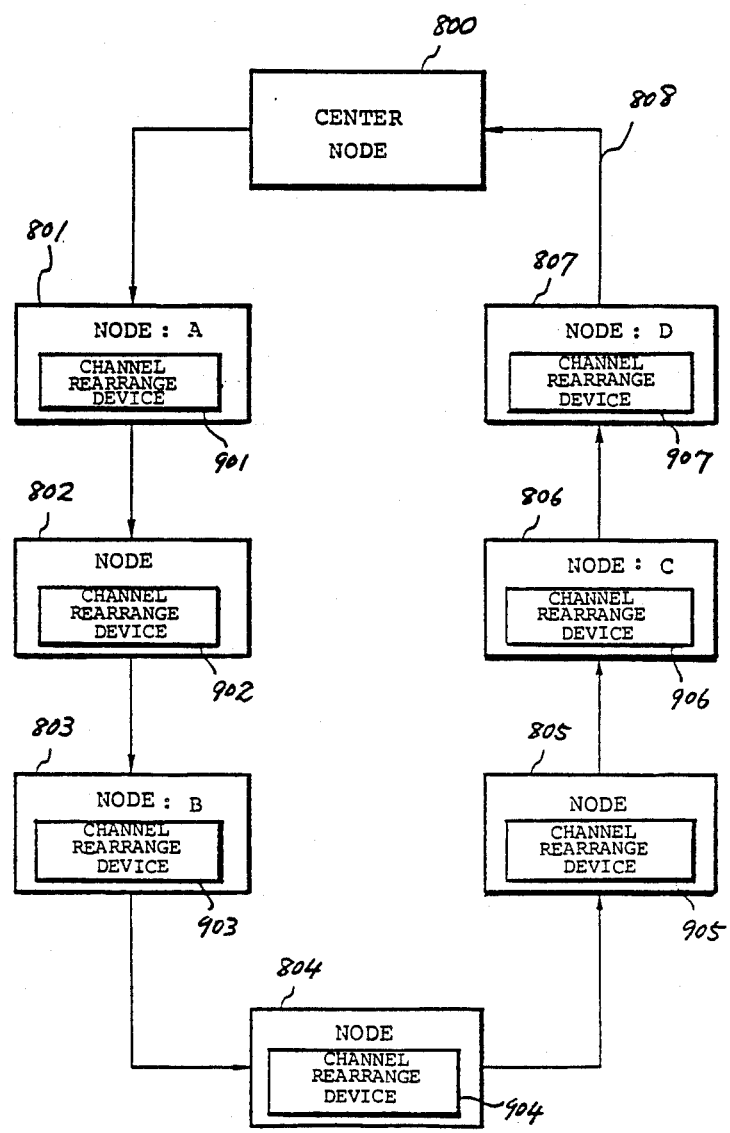
FIG. 13 is a schematic diagram showing another embodiment of the present invention.

Referring to FIG. 13, another embodiment of the channel assignment system in accordance with the present invention is shown. In this particular embodiment, the system comprises a center node 800 and nodes 801–807 which are interconnected by a transmission line 808. The nodes 801–807 are provided with channel rearrange devices 901–907, respectively. The number of channels available for the multi-station duplex communication between a plurality of nodes, which is based on time division circuit switching, is smaller than that of the nodes by one, as previously stated. In the illustrative embodiment, the channel rearrange devices 901–907 associated with the nodes 801–807 which are distributed in the loop network are each constructed to logically shift the usable channels at each time of data transmission and reception, thereby rearranging the channels. The rearranged channels are transmitted from one node to the next node so that, at the end of one round through the loop, the channel rearrangement is restored to a one before the round.

In the loop network of FIG. 13, let the nodes 801, 803, 806 and 807 be called nodes A, B, C and D, respectively. The channel assignment system will be described assuming that multi-station duplex communication is effected between the four nodes A–D on a time division circuit switching basis.

Figure 14A:
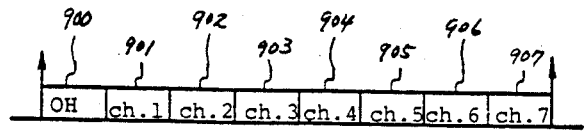

In FIG. 13, assume that information is routed counterclockwise through the loop network. In the case where all the four nodes A–D are conditioned for duplex communication, the center node 800 before the communication secures three idle channels and informs each of the nodes A–D of a particular channel available for the node and to which channels the other three pieces of information to be received by the node have been assigned, based on the positional relationship between the nodes A–D. A specific example is shown in FIGS. 14A–14E. In FIG. 14A, a channel arrangement is shown and comprises an overhead 900, a channel 1 designated by the reference numeral 901, a channel 2 designated by the reference numeral 902, a channel 3 designated by the reference numeral 903, a channel 4 designated by the reference numeral 904, a channel 5 designated by the reference numeral 905, a channel 6 designated by the reference numeral 906, and a channel 7 designated by the reference numeral 907.

When the group of the nodes A–D has sent a request to the center node 800, the latter secures three idle channels which in the illustrative embodiment is assumed to be the channels 2, 5 and 6. The center node 800 notifies the node A of the fact that information from the node B is stored in the channel 2, information from the node C in the channel 5, and information from the node D in the channel 6. The center node 800 also informs the node A of the fact that the latter may write the own information in the channel 6 after reading the those information associated with the nodes B–D and, then, logically shifting the node C information from the channel 5 to the channel 2 and the node D information from the channel 6 to the channel 5. Likewise, the center node 800 informs the node B of the fact that the node C information is stored in the channel 2 and the node A information in the channel 6, and the fact that after reading those information the node B may write the own information in the channel 6 after logically shifting the node D information from the channel 5 to the channel 2 and the node A information from the channel 6 to the channel 5.

Further, the center node 800 informs the node C of the fact that the node D information is stored in the channel 2, the node information A in the channel 5, and the node B information in the channel 6, and the fact that after reading those information the node C may write the own information in the channel 6 after logically shifting the node A information fromm the channel 5 to the channel 2 and the node B information from the channel 6 to the channel 5. Finally, the center node 800 informs the node D of the fact that the node A information is stored in the channel 2, the node B information in the channel 5, and the node C information in the channel 6, and the fact that after reading those informations, the node D may write the own information in the channel 6 after logically shifting the node B information from the channel 5 to the channel 2 and the node C information from the channel 6 to the channel 5.

The procedure for setting up each duplex communication link in accordance with the channel assignment system of the present invention is characterized in that the only information which has to be supplied to each of the participant nodes is to which channel the pieces of information from the other three modes, which should be received by the particular node, have been assigned, the logical shifting operations and write channels being implemented with common information. Such a procedure, therefore, is suitable for distributed control. For example, in this particular embodiment, the nodes share the common knowledge that the content of the channel 5 is shifted to the channel 2 and that of the channel 6 to the channel 5, while the own information may be written in the channel 6.

In FIGS. 14B–14E, a condition of use of the channels at each node after the start of a communication is shown. The reference numerals 908–911 designate respectively read lines to the nodes A–D, while the reference numerals 912–915 designate respectively write lines from the nodes A–D. Further, the reference numerals 916–923 designate logical channel shifting operations which are performed at the respective nodes.

It will be seen from the foregoing description taken with FIGS. 14B–14E that the node A shifts the node C information from the channel 5 to the channel 2 and the node D information from the channel 6 to the channel 5 to delete the node B information, and writes the own information in the channel 6 which is then idle. Likewise, the node B deltes the node C information, the node C deletes the node D information, and the node D deletes the node A information. This is possible due to the topology of a loop. Specifically, concerning the node A, the node B information from the node B is read by the nodes C and D before reaching the node A, that is, the node A is the last node to read the node B information. Hence, deleting the node B information by shifting another node information to the channel 2 which has stored the node B information does not give rise to any problem.

Next, the channel shifting function assigned to the channel rearrange devices 901–907 of the nodes 801–807 will be described. As previously mentioned, in the examples of FIGS. 14A–14A, the channel shifting function shared by the nodes A–D is shifting the content of the channel 5 to the channel 3 and that of the channel 6 to the channel 5.

The channel assignment system of the illustrative embodiment effects multi-station duplex communication between a plurality of nodes using channels which are smaller in number than the nodes by use. The prerequisite with such a system is that information sent from a certain node be deleted at the last node on the transmission loop and, when returned to the own node after a round, the information associated with the other three nodes be in the same channel assignment as before the round. The channel shifting function of the channel rearrange device at each node is characterized by the fact that each node on the loop deletes the information and fixes the channels by a distributed control basis. Specifically, as clearly understood from the example of FIGS. 14A–14E, information transmitted from a certain node is necessarily written in the channel 6 and necessarily logically shifted one channel on the three particular channels in the same direction at each time of data transmission and reception at the other three nodes. Hence, in the cyclic transmission system, or loop, information sent from the own node is always deleted at the immediately preceding node and, further, the channels after one round are necessarily in the same arrangement as before the round.

In summary, it will be seen that the channel assignment system in accordance with the first embodiment of the present invention fulfills duplex communication between a plurality of participant nodes using channels which are smaller in number than those of the prior art system by one, thereby enhancing efficient utilization of the system. Furthermore, since each of the nodes is capable of transmitting and receiving information by use of fixed channels, it is needless for any of the nodes to perform extra controls over the channels. That is, it is only the network control node that has to perform controls.

The channel assignment system in accordance with the second embodiment of the present invention also fulfills duplex communication between a plurality of participant nodes using channels which are smaller in number than those of the prior art system by one, thereby enhancing efficient utilization of the system. In addition, even if a plurality of communication links exist, that is, a plurality of node groups for multi-station duplex communication exist, the fact that the channel arrangement is effected on a distribution basis in the links eliminates concentration of loads as would occur in a system wherein a single control node is used for centralized control and allows loads to be distributed.

Various modifications will become possible for those skilled in the art after receiving the teachings of the present disclosure without departing from the scope thereof.

What is claimed is:

1. A communication network comprising:
   a plurality of nodes connected in series with one aother in a single loop communication system in which information from a node is transmitted to other nodes using a time division channel switching method, and
   a network control node connected in said single loop, said network control node including means for rearranging channel assignments by cyclically shifting the channels after every round through said single loop, said channel assignment rearranging means operative for rearranging channel assignments on a number, n, of channels smaller in number than a number, N, of nodes communicating with each other such that $n=N-1$, where n and N are integers and N is greater than 2,
   wherein $N-1$ channels are assigned upon establishment of communication between N nodes, where information from each node is simultaneously transmitted to the remaining $N-1$ nodes by using said $N-1$ channels on said loop system.

2. A communication network comprising:
   a plurality of nodes distributed in a single loop communication system in which information from a node is transmitted to other nodes using a time division channel switching method, each of said nodes including channel rearranging means for controlling channel assignments, and
   each of said channel rearranging means operative for rearranging channel assignments on a number, n, of channels smaller in number than a number, N, of nodes communicating with each other such that $n=N-1$, where n and N are integers and N is greater than 2,
   wherein $N-1$ channels are assigned upon establishment of communication between N nodes, where information from each node is simultaneously transmitted to the remaining $N-1$ nodes by using said $N-1$ channels on said loop system.

3. A multi-station duplex communication network as recited in claim 2, further including center node means for selecting idle channels and controlling channel assignments after each round through said loop.

* * * * *